United States Patent
Zhou et al.

(10) Patent No.: US 7,633,727 B2
(45) Date of Patent: *Dec. 15, 2009

(54) ARC FAULT CIRCUIT INTERRUPTER AND SERIES ARC FAULT DETECTION METHOD USING PLURAL HIGH FREQUENCY BANDS

(75) Inventors: Xin Zhou, Franklin Park, PA (US); John J. Shea, Pittsburgh, PA (US); Kevin L. Parker, Pittsburgh, PA (US); Theodore J. Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/679,298

(22) Filed: Feb. 27, 2007

(65) Prior Publication Data

US 2008/0204950 A1    Aug. 28, 2008

(51) Int. Cl.
*H02H 3/00* (2006.01)
*H02H 9/08* (2006.01)
*H02H 7/26* (2006.01)
*H02H 3/08* (2006.01)
*H02H 9/02* (2006.01)

(52) U.S. Cl. .............................. 361/42; 361/43; 361/44; 361/45; 361/46; 361/47; 361/48; 361/49; 361/50; 361/93.1

(58) Field of Classification Search ........................ None
See application file for complete search history.

(56) References Cited

U.S. PATENT DOCUMENTS

| 5,206,596 | A | 4/1993 | Beihoff et al. |
|---|---|---|---|
| 5,224,006 | A | 6/1993 | MacKenzie et al. |
| 5,691,869 | A | 11/1997 | Engel et al. |
| 5,729,145 | A | 3/1998 | Blades |
| 6,414,829 | B1 | 7/2002 | Haun et al. |
| 6,522,228 | B2 | 2/2003 | Wellner et al. |
| 6,522,509 | B1 | 2/2003 | Engel et al. |
| 6,542,056 | B2 | 4/2003 | Nerstrom et al. |
| 6,710,688 | B2 | 3/2004 | Wellner et al. |
| 6,798,628 | B1 * | 9/2004 | Macbeth ....................... 361/42 |
| 7,110,864 | B2 | 9/2006 | Restrepo et al. |
| 2008/0204949 | A1 * | 8/2008 | Zhou et al. ..................... 361/42 |

OTHER PUBLICATIONS

Underwriters Laboratories, Inc., "UL 1699 Arc-Fault Circuit-Interrupters", Apr. 7, 2006, 112 pp.

* cited by examiner

*Primary Examiner*—Albert W Paladini
*Assistant Examiner*—Dharti Patel
(74) *Attorney, Agent, or Firm*—Martin J. Moran

(57) ABSTRACT

A circuit interrupter includes band pass filters cooperating with a current sensor to output bands having different, non-overlapping ranges of frequencies, peak detectors cooperating with the filters to detect corresponding peak current values, envelope detectors cooperating with the filters to detect corresponding occurrences from the bands being within corresponding predetermined magnitude ranges, a counter counting the occurrences, and a processor providing and disabling series arc detection when sensed current is greater than a first predetermined value. The processor determines tallies responsive to peak current values exceeding corresponding thresholds, determines series arcing from sensed current being less than the first predetermined value for a predetermined time, the tally for a current half-cycle being nonzero, and a count for the current half-cycle being different than the count for an immediately previous half-cycle of like polarity by at least a second predetermined value. A series chaos accumulator is increased responsive to series arcing.

21 Claims, 9 Drawing Sheets

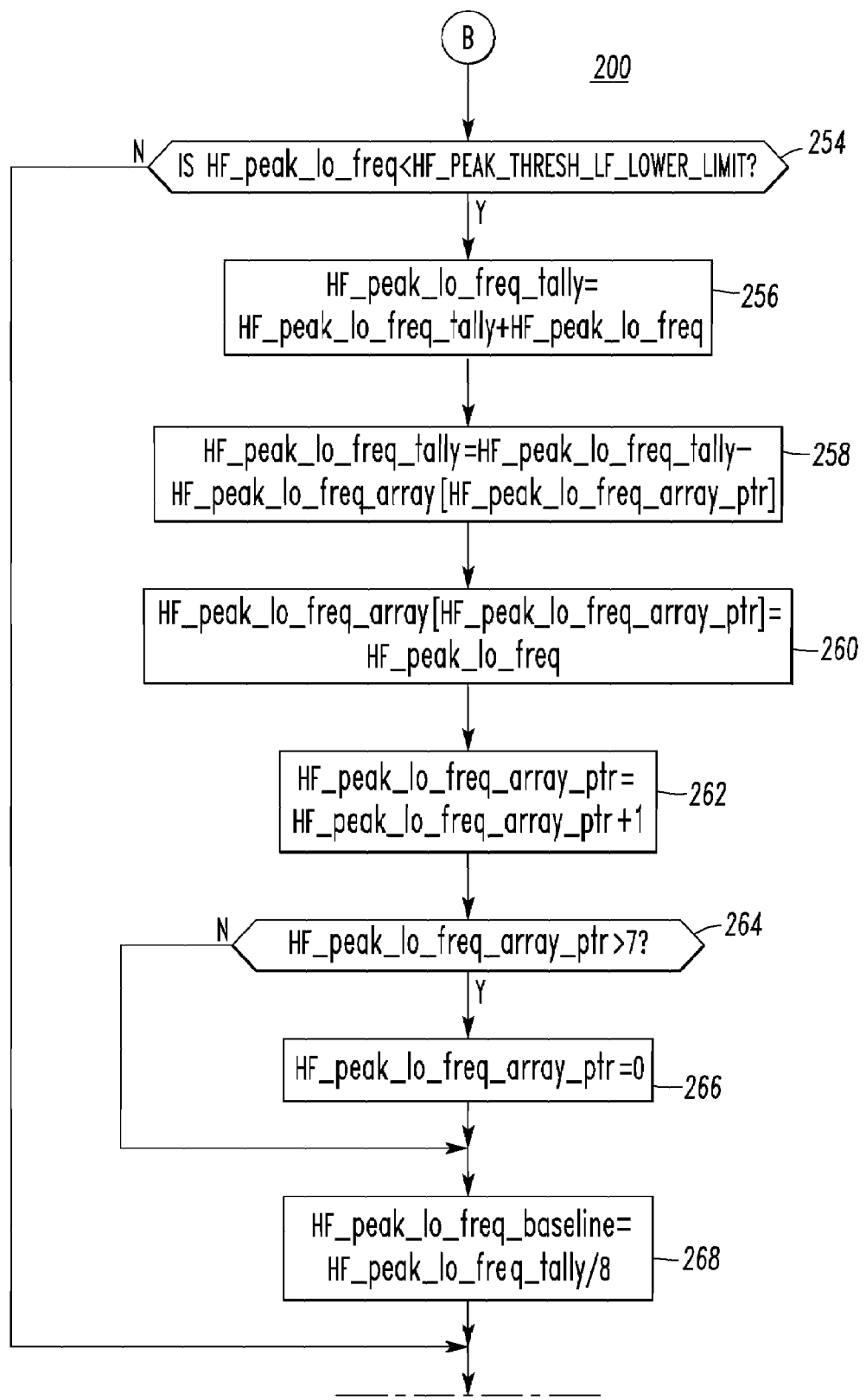
FIG.2C1

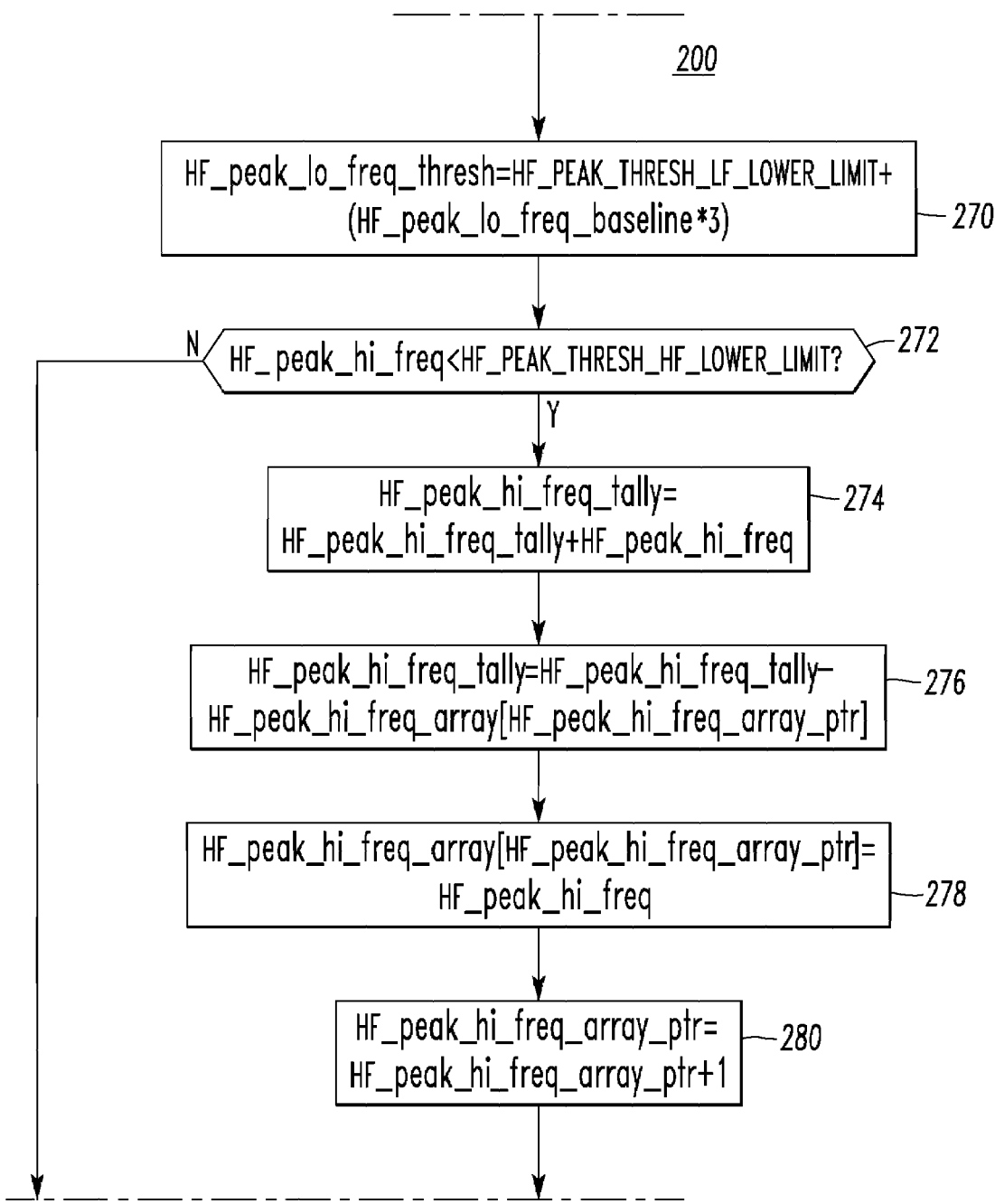
FIG.2C2

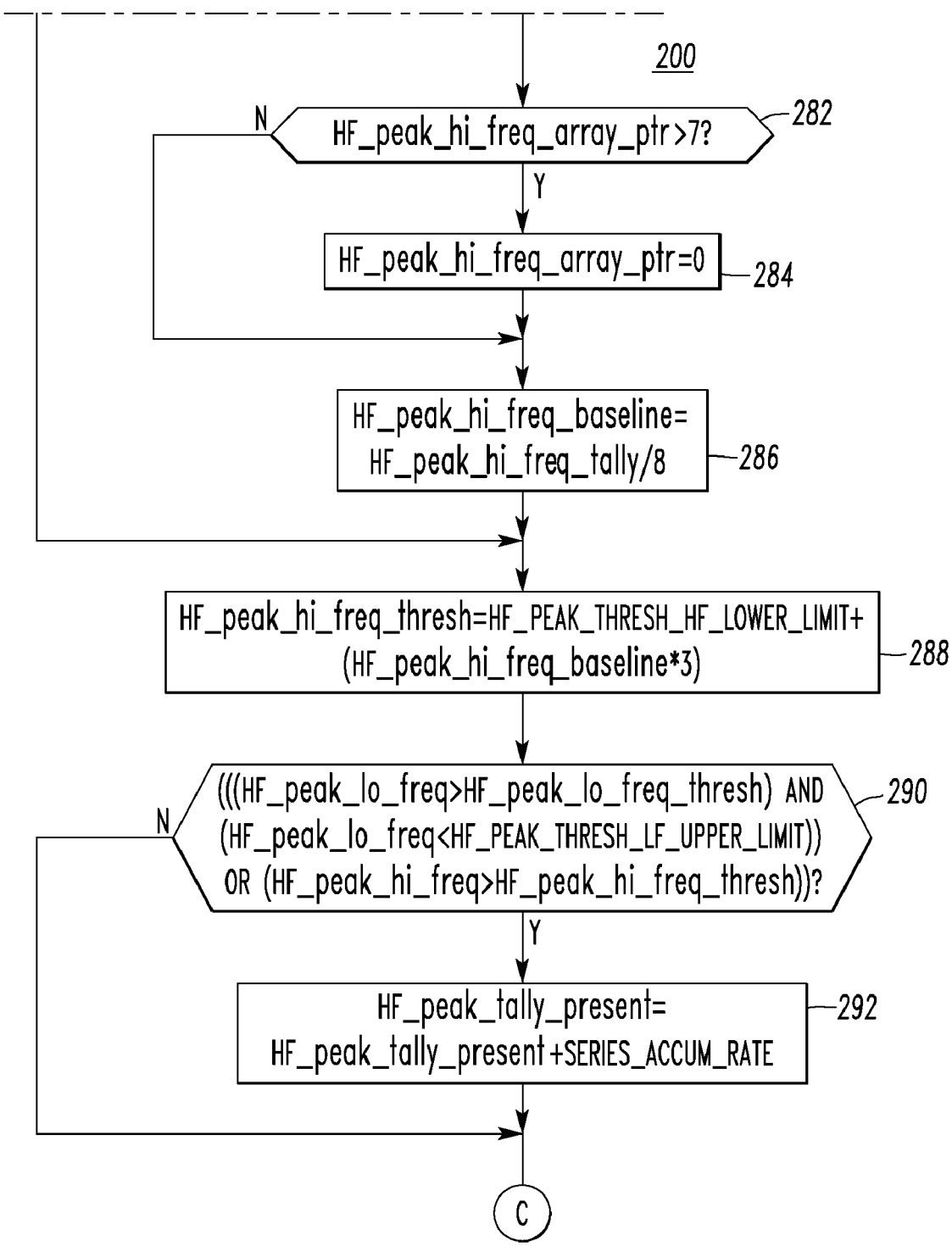
FIG.2C3

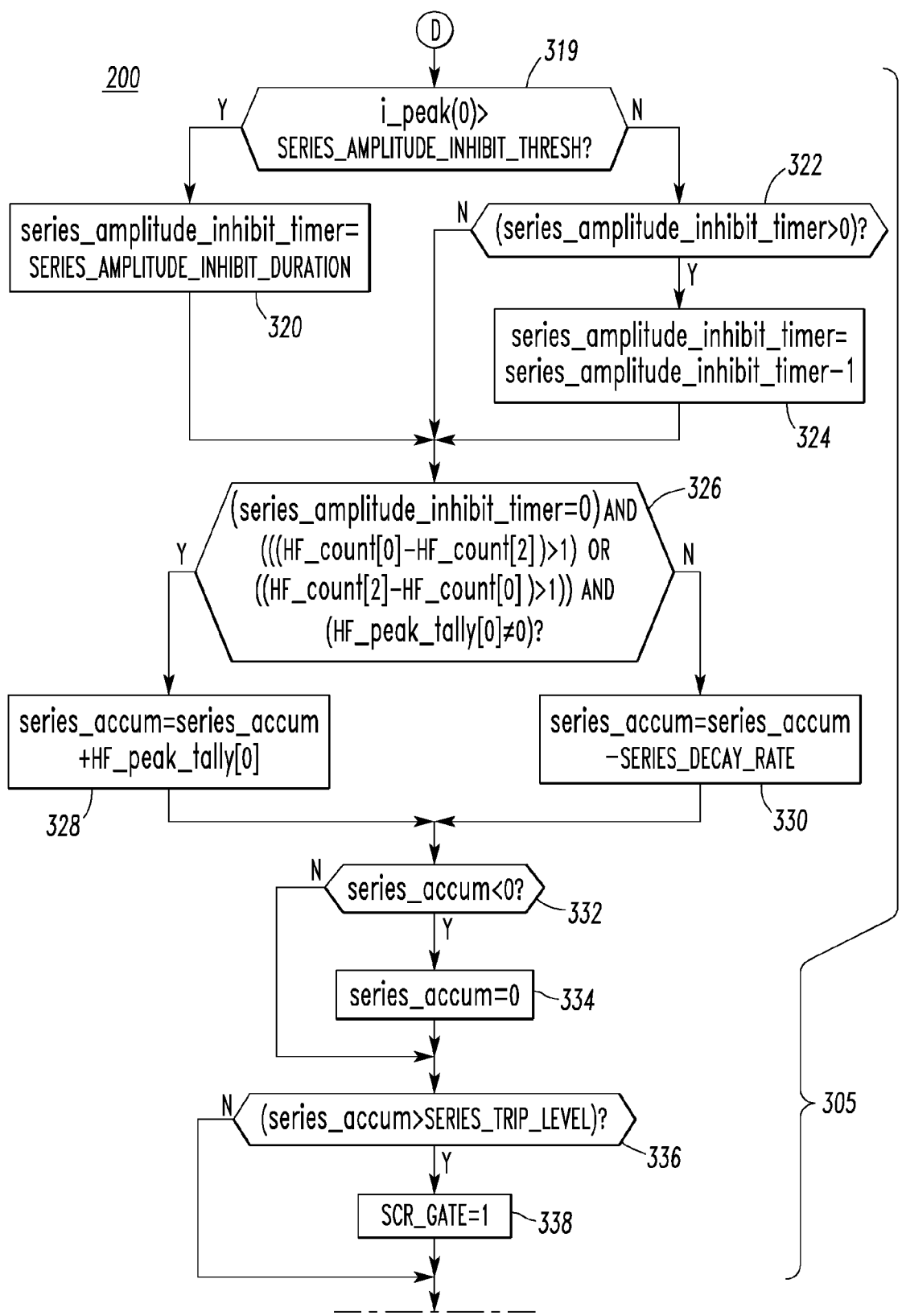
FIG.2E1

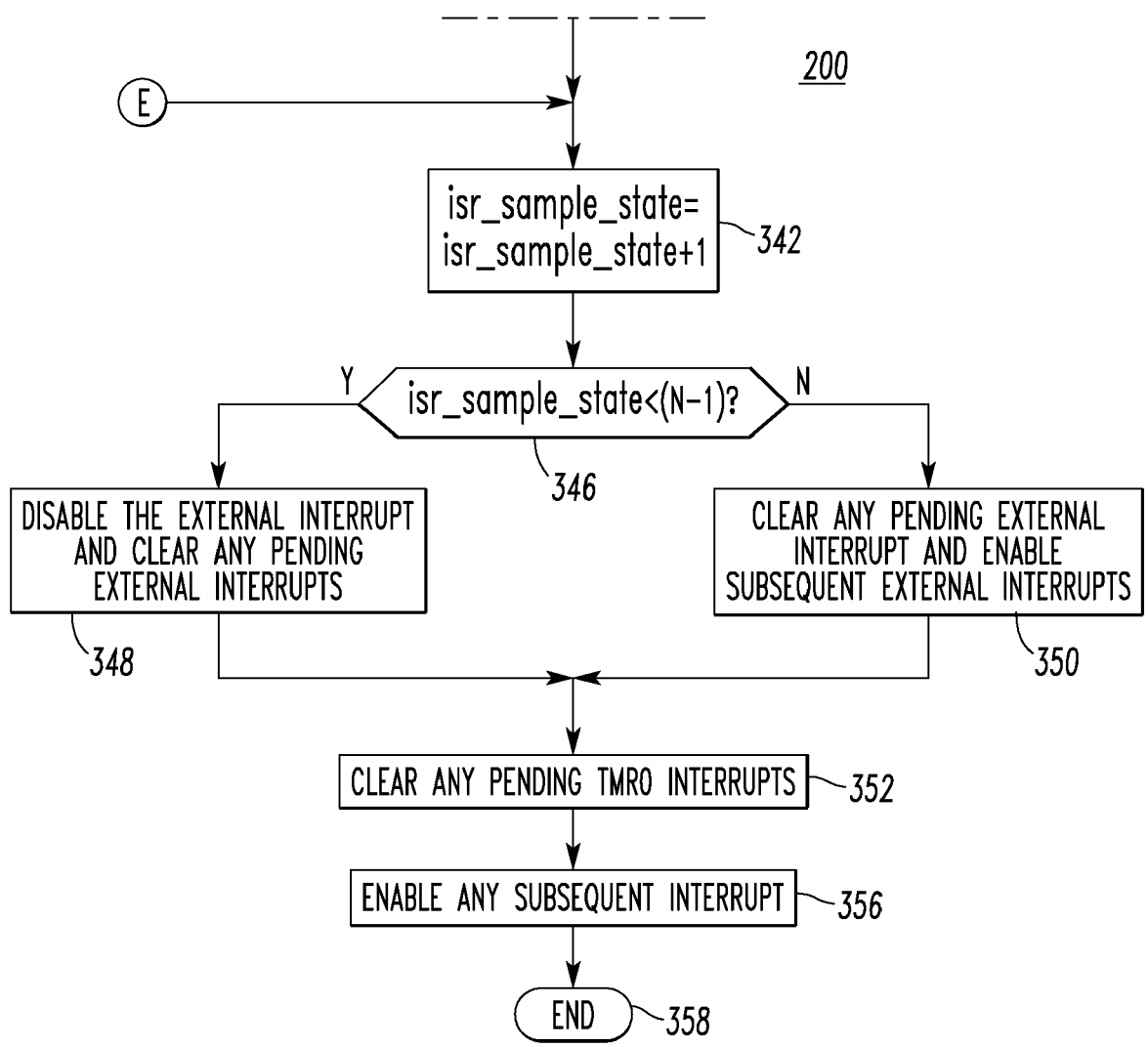
FIG.2E2

ARC FAULT CIRCUIT INTERRUPTER AND SERIES ARC FAULT DETECTION METHOD USING PLURAL HIGH FREQUENCY BANDS

CROSS-REFERENCE TO RELATED APPLICATION

This application is related to commonly assigned, concurrently filed:

U.S. patent application Ser. No. 11/679,281, filed Feb. 27, 2007, entitled "Arc Fault Circuit Interrupter And Method Of Parallel And Series Arc Fault Detection".

BACKGROUND OF THE INVENTION

1. Field of the Invention

This invention pertains generally to circuit interrupters and, more particularly, to arc fault circuit interrupters. The invention also relates to methods of detecting series arc faults.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from series arc faults, ground faults and line-to-neutral faults up to the outlet; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from series arc faults, line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

During sporadic arc fault conditions, the overload capability of a conventional circuit breaker will not function since the root-mean-squared (RMS) value of the fault current is too small to activate the automatic magnetic trip circuit. The addition of electronic arc fault sensing to a circuit breaker can add one of the elements required for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

Arc faults can be series or parallel. Examples of a series arc are a broken wire where the ends of the broken wire are close enough to cause arcing, or a relatively poor electrical connection. Parallel arcs occur between conductors of different potential including, for example, a power conductor and a ground. Unlike a parallel arc fault, series arc faults do not usually create an increase in current since the fault is in series with the load. In fact, a series arc fault may result in a slight reduction in load current and not be detected by the normal overload and overcurrent protection of conventional protection devices. Even the parallel arc, which can draw current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function.

Known technology for arc fault detection typically utilizes a current signature at the fundamental frequency (e.g., 50 or 60 Hz) and other relatively low frequencies (e.g., below 100 kHz). A problem associated with this technology is that it highly depends on the electric loads that can sometimes generate false arc fault signatures at the fundamental frequency as well as at other relatively low frequencies.

U.S. Pat. No. 5,206,596 discloses an arc detector transducer including an electric field sensor sensing the electric field established about a conductor by the occurrence of an electrical arc in the circuit, and a magnetic field sensor sensing the magnetic field established about the conductor by the occurrence of the electrical arc. The sensors detect high frequency signals (preferred bands are from about 1 kHz to about 5 MHz) generated by the arc. A band pass filter having a wide band path from 100 kHz to 1 MHz is employed in order to try to identify a random chaotic pattern generated in response to the electromagnetic field established about the conductor due to the occurrence of the arc.

U.S. Pat. No. 5,729,145 discloses the detection of an arc fault by correlating the high frequency signal (10 kHz to 1 GHz) generated by the arc to the system voltage or current wave zero crossing or waveform phase angle. During the time the arc is conducting current, it produces wideband, high-frequency noise. During the time the arc is not conducting current, it produces no noise. The resulting characteristic pattern of high-frequency noise with synchronous gaps is unique to arcing. An algorithm analyzes repetitive patterns in the amplitude of the noise to detect arcing.

U.S. Pat. No. 6,414,829 discloses analyzing current waveforms and broadband noise to determine if arcing is present in electrical conductors. A high current arc is identified as a current waveform that has a combination of changes in current (di/dt) and broadband noise (10 kHz to 100 kHz). A broadband noise detector comprises first and second band-pass filter circuits, which receive the rate of change of current signal from a di/dt sensor. The band passes of these filter circuits are selected at frequency bands which are representative of broadband noise typical of arcing faults. The band-pass frequencies are selected as typically 35 kHz and 70 kHz. Each of the band-pass filter circuits feeds a filtered signal, comprising those components of an input signal from the di/dt sensor which fall within their respective band-pass frequency pass bands, to respective threshold detector circuits to determine if there is an arc fault. Nothing is disclosed regarding complete separation of the two frequency bands.

U.S. Pat. No. 7,110,864 discloses an amplitude-duration relationship for both arcing and non-arcing conditions. In a first zone, which is characterized by relatively short duration events, the events are recognized, discriminated and/or treated as likely representing high frequency noise. In a second, intermediate arc detection zone, those events having at least a predetermined minimum current amplitude are recognized and/or treated as likely representing either an arc fault condition or in-rush condition. In a third zone, which is characterized by relatively long duration events, the events are recognized, discriminated and/or treated as likely representing low-frequency noise and/or AC current.

There is room for improvement in arc fault circuit interrupters.

There is also room for improvement in methods of detecting series arc faults.

SUMMARY OF THE INVENTION

These needs and others are met by embodiments of the invention, which provide improvements in series arc detection by an arc fault circuit interrupter including two band pass filters having different, non-overlapping ranges of frequencies of sensed current.

In accordance with one aspect of the invention, an arc fault circuit interrupter is for an alternating current power circuit including a plurality of half-cycles, the arc fault circuit interrupter comprises: separable contacts; an operating mechanism structured to open and close the separable contacts; at least one current sensor structured to sense current flowing through the separable contacts; a first band pass filter cooperating with one of the at least one current sensor to output a first pass band having a first range of frequencies of the sensed current; a second band pass filter cooperating with one of the at least one current sensor to output a second pass band having a second range of frequencies of the sensed current, the second range of frequencies not overlapping and being greater than the first range of frequencies; a first peak detector cooperating with the first band pass filter to detect a plurality of first peak current values from the first pass band; a second peak detector cooperating with the second band pass filter to detect a plurality of second peak current values from the second pass band; a first envelope detector cooperating with the first band pass filter to detect a plurality of first occurrences from the first pass band being within a first predetermined range of magnitudes; a second envelope detector cooperating with the second band pass filter to detect a plurality of second occurrences from the second pass band being within a second predetermined range of magnitudes; a counter structured to count the first and second occurrences; and a processor structured to provide series arc detection and cooperating with one of the at least one current sensor to disable the series arc detection when the sensed current is greater than a first predetermined value, the processor further cooperating with the counter to determine a plurality of counts from the counter for the half-cycles, the processor further cooperating with the first and second peak detectors to determine a plurality of tallies responsive to one of the first peak current values exceeding a first threshold for the half-cycles or one of the second peak current values exceeding a second threshold for the half-cycles, the processor being further structured to determine presence of series arcing in the power circuit from: (1) the sensed current being less than the first predetermined value for at least a predetermined time, (2) the tally for a current one of the half-cycles being not zero, and (3) the count of the counter for the current one of the half-cycles being different than the count of the counter for an immediately previous one of the half-cycles of like polarity by at least a second predetermined value, the processor being further structured to increase a series chaos accumulator responsive to the presence of series arcing.

The first and second thresholds may be first and second lower thresholds, respectively, both of the first and second lower thresholds being structured to enable the processor to detect noise generated by a series arc fault; and the processor may be further structured to determine the plurality of tallies responsive to the one of the first peak current values exceeding the first lower threshold and being less than a third upper threshold for the half-cycles or the one of the second peak current values exceeding the second lower threshold for the half-cycles.

The first and second thresholds may be first and second lower thresholds, respectively; the first band pass filter may have an output that is input by the first peak detector; the second band pass filter may have an output that is input by the second peak detector; and the processor may be further structured to remove baseline shifting of the outputs of the peak detectors.

The minimum frequency of the first range of frequencies may be about 50 kHz; the maximum frequency of the second range of frequencies may be about 2 MHz; and each of the first and second band pass filters may have a center frequency to bandwidth ratio of greater than about 5.

The processor may comprise an output; and the processor may be further structured to determine the occurrence of a series arc fault when the series chaos accumulator is greater than a third predetermined value and to responsively set the output of the processor to cause the operating mechanism trip open the separable contacts.

As another aspect of the invention, a method of detecting series arc faults is for an alternating current power circuit including a plurality of half-cycles. The method comprises: sensing current flowing through the power circuit and outputting a sensed current value; employing a first band pass filter to output a first pass band having a first range of frequencies of the sensed current value; employing a second band pass filter to output a second pass band having a second range of frequencies of the sensed current value, the second range of frequencies not overlapping and being greater than the first range of frequencies; detecting a plurality of first peak current values from the first pass band; detecting a plurality of second peak current values from the second pass band; detecting a plurality of first occurrences from the first pass band being within a first predetermined range of magnitudes; detecting a plurality of second occurrences from the second pass band being within a second predetermined range of magnitudes; counting the first and second occurrences and outputting a count value; providing series arc detection and disabling the series arc detection when the sensed current value is greater than a first predetermined value; determining a plurality of counts from the count value for the half-cycles; determining a plurality of tallies responsive to one of the first peak current values exceeding a first threshold for the half-cycles or one of the second peak current values exceeding a second threshold for the half-cycles; determining presence of series arcing in the power circuit from: (1) the sensed current value being less than the first predetermined value for at least a predetermined time, (2) the tally for a current one of the half-cycles being not zero, and (3) the count for the current one of the half-cycles being different than the count for an immediately previous one of the half-cycles of like polarity by at least a second predetermined value; and increasing a series chaos accumulator responsive to the presence of series arcing.

The method may determine the occurrence of a series arc fault when the series chaos accumulator is greater than a third predetermined value and responsively interrupt the current flowing through the power circuit.

The method may further comprise periodically sampling the first peak current values from the first pass band; periodically sampling the second peak current values from the second pass band; and introducing random variations in the periodically sampling of the first peak current values from the first pass band and the second peak current values from the second pass band.

The method may employ first and second lower thresholds as the first and second thresholds, respectively; remove baseline shifting of the plurality of first peak current values detected from the first pass band; and remove baseline shifting of the plurality of second peak current values detected from the second pass band.

BRIEF DESCRIPTION OF THE DRAWINGS

A full understanding of the invention can be gained from the following description of the preferred embodiments when read in conjunction with the accompanying drawings in which:

FIGS. 2A, 2B, 2C1-2C3, 2D and 2E1-2E2 form a flowchart of a series arc fault detection routine executed by the processor of FIG. 1.

DESCRIPTION OF THE PREFERRED EMBODIMENTS

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

As employed herein, the term "current sensor" shall mean a current transformer or any suitable sensor for sensing current flowing through a conductor.

The invention is described in association with a miniature circuit breaker, although the invention is applicable to a wide range of arc fault circuit interrupters.

Figure 1:
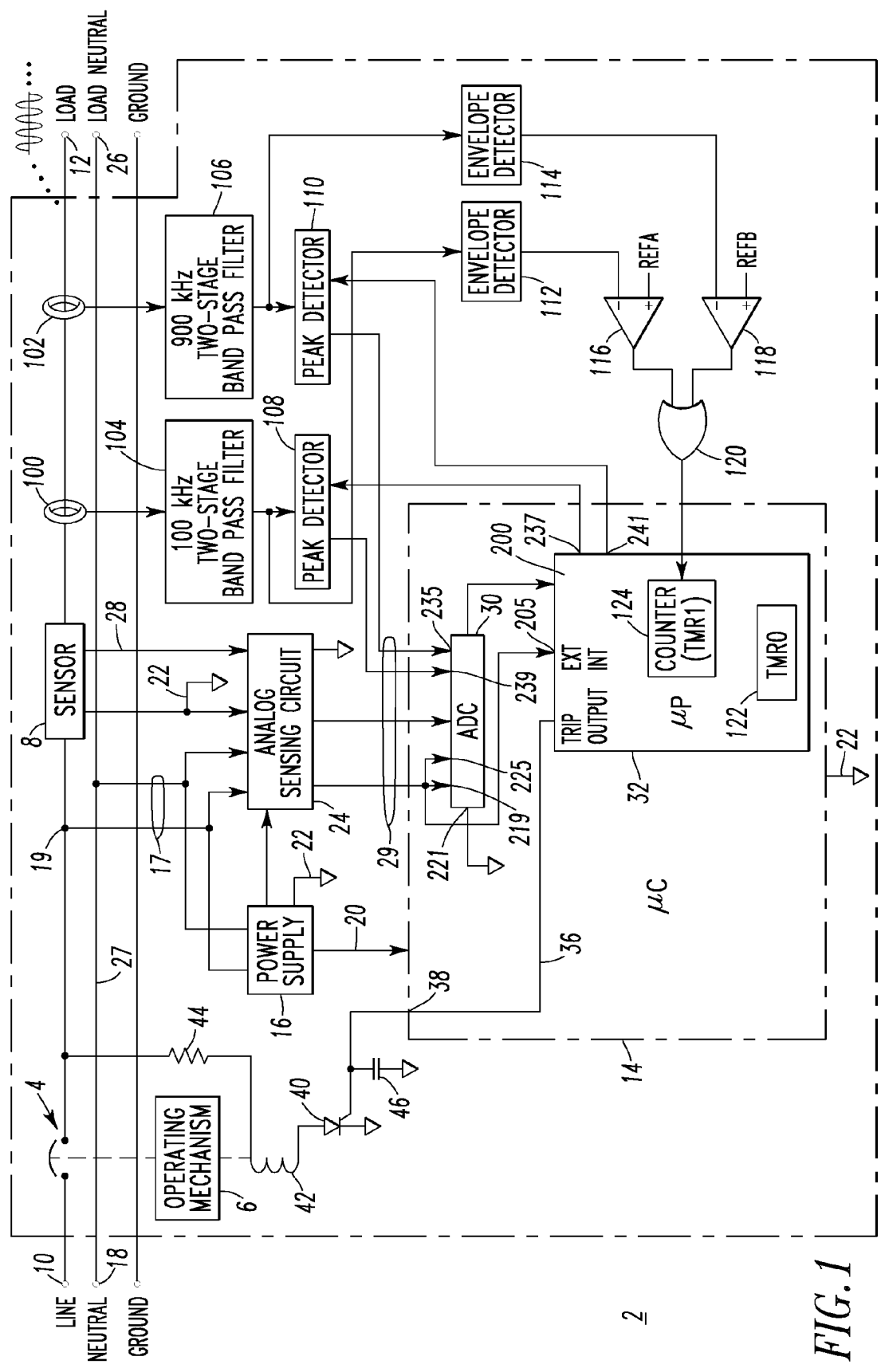
FIG. 1 is a block diagram in schematic form of a circuit breaker including a processor in accordance with an embodiment of the invention.

Referring to FIG. 1, a miniature circuit breaker 2 includes separable contacts 4, an operating mechanism 6 structured to open and close the separable contacts 4, and a sensor 8 structured to sense current flowing through the separable contacts 4 between a line terminal 10 and a load terminal 12. The circuit breaker 2 also includes a processor, such as the example microcomputer (μC) 14 (e.g., without limitation, a Microchip PIC16F685 microcontroller, marketed by Microchip Technology Incorporated of Chandler, Ariz.), cooperating with the sensor 8 and the operating mechanism 6 to trip open the separable contacts 4, and a power supply 16 structured to at least power the μC 14. The power supply 16 is, for example, an alternating current (AC) to direct current (DC) (AC/DC) power supply which receives a line-to-neutral voltage 17 between a neutral terminal 18 and a conductor 19 that is electrically connected downstream of the separable contacts 4 and to or toward the load terminal 12. The AC/DC power supply 16 provides a suitable DC voltage 20 and a common 22 to the μC 14 and, as needed, powers, for example, an analog sensing circuit 24.

The analog sensing circuit 24 receives inputs of the line-to-neutral voltage 17, as referenced to the neutral terminal 18, a load neutral terminal 26 and a neutral conductor 27, and a voltage 28 representative of the load current (e.g., without limitation, the line current flowing through the current sensor 8). Various input voltage signals 29 from, for example, the analog sensing circuit 24 are input by a plural channel analog-to-digital converter (ADC) 30 of the μC 14 and are converted to corresponding digital values for input by μP 32. The μP 32 includes a series arc fault detection routine 200 as will be explained.

Responsive to one or more conditions as sensed from the ADC input voltage signals 29, the μP 32 generates a trip signal 36 that passes through the μC 14 to output 38 and turns SCR 40 on. The SCR 40, in turn, energizes a trip solenoid 42 and, thereby, actuates the operating mechanism 6 to trip open the separable contacts 4 in response to, for example, an overvoltage, an arc fault or other trip condition. The trip solenoid 42 is, thus, a trip actuator cooperating with the μP 32 and the operating mechanism 6 to trip open the separable contacts 4 responsive to one of the different trip conditions detected by the μP 32. A resistor 44 in series with the coil of the solenoid 42 limits the coil current and a capacitor 46 protects the gate of the SCR 40 from voltage spikes and false tripping due to noise.

As an equivalent alternative to the example, as shown, the resistor 44 may be electrically connected to the neutral conductor 27, with the conductor 19 being electrically connected to the common reference node 22.

In this example, three current sensors are shown: sensor 8 and two current transformers (CTs) 100,102, although one, two or three current sensors may be employed. Hence, one current sensor may feed the analog sensing circuit 24 and the two bandpass filters 104,106. As another example, the two CTs 100,102 not only measure the two high frequency signals from the sensed current, but also measure the power frequency signal from the sensed current. The CTs 100,102 sense di/dt and their outputs are integrated over a finite time period to obtain the current signal. Here, two CTs are employed to optimize the outputs in the desired frequency ranges, in order that significant amplification of the CTs' outputs is avoided.

Although not shown, the current sensor 8 may equivalently sense the current flowing through the neutral conductor 27.

The outputs of the CTs 100 and 102 are input by an example 100 kHz two-stage band pass filter 104 and an example 900 kHz two-stage band pass filter 106, respectively. A non-limiting example of the first range of frequencies of the first band pass filter 104 is about 100 kHz+/−3.125 kHz (center frequency to bandwidth ratio (Q) of about 16). A non-limiting example of the second range of frequencies of the second band pass filter 106 is about 900 kHz+/−28.125 kHz (Q of about 16). Preferably, each of the first and second band pass filters 104,106 have a center frequency to bandwidth ratio (Q) of greater than about 5.

The outputs of the filters 104 and 106 are input by a first peak detector 108 and a second peak detector 110, and by a first envelope detector 112 and a second envelope detector 114, respectively. The outputs of the peak detectors 108 and 110 are input by respective input channels 239 and 235 of the ADC 30. The outputs of the envelope detectors 112 and 114 are input by the negative inputs of first comparator 116 and second comparator 118, respectively. Those comparators 116,118 use respective references REFA,REFB at their positive inputs. The outputs of the comparators 116,118 are input by OR gate 120 the output of which is input by a counter (TMR1) 124 of μP 32. The μP 32 also includes a timer (TMR0) 122, as will be discussed.

Plural (e.g., two or more) high frequency, relatively narrow bands of the corresponding band pass filters 104,106 are completely separated and do not overlap. As will be discussed, the peak detector outputs of these high frequency signals above predefined thresholds are either 'OR'ed or 'AND'ed to determine if there is an arc fault. This is important since a relatively narrow band of high frequency signal is desired in order to minimize high frequency noise generated by a normal load. Also, the two relatively narrow bands of high frequencies need to be separated far enough, in order that they do not duplicate information as well as provide high frequency information generated by arcs in various electrical circuits. The high frequency current signals that are input by the corresponding ADC channels 235,239 are employed to detect arc faults. The plural frequency bands are separated apart enough to capture the high frequency signatures generated by arcs based on high frequency signal peak detection. This takes into account the high frequency signature noise generated by the arc, while eliminating signal noises generated by the load (not shown, but electrically connected to the terminals 12 and 26) in certain frequency bands as well as overcoming the impact caused by signal strength attenuation due to loads with capacitive impedance in the circuit, such as EMI filters (e.g., without limitation, Corcom® filters) (not shown).

When a capacitive load (not shown) is connected in parallel to the power circuit (not shown) downstream of the AFCI circuit breaker 2, a signal at relatively higher frequencies, such as 900 kHz, generated by an arc fault (not shown) in that power circuit may be shunted through the capacitor (not shown) in the capacitive load rather than going through the AFCI circuit breaker 2 and the corresponding CT 102 and band pass filter 106 due to the impedance difference between the capacitive load and the line power circuit where the AFCI circuit breaker 2 is located. Meanwhile, a signal at a relatively lower frequency, such as 100 kHz, is less affected and there is still a detectable signal going through the corresponding band pass filter 104.

The band pass filters 104,106 may cover corresponding ranges that are centered from about 50 kHz up to about 2 MHz. The outputs of these relatively narrow band pass filters 104,106 of corresponding high frequency (as detected through the corresponding peak detectors 108,110) are "OR"ed by the OR gate 120 to detect if there is an arc. The first envelope detector 112 cooperates with the first band pass filter 104 to detect a plurality of first occurrences from that first pass band being within a first predetermined range of magnitudes (e.g., without limitation, about 2.652 V and higher). The second envelope detector 114 cooperates with the second band pass filter 106 to detect a plurality of second occurrences from that second pass band being within a second predetermined range of magnitudes (e.g., without limitation, about 2.756 V and higher). A suitable high frequency pulse counter (TMR1) 124 is employed to eliminate repetitive signals from certain loads. Moving average baselines (268 and 286 of FIGS. 2C1 and 2C3, respectively) are employed to eliminate "good arcs" in certain loads, such as certain chop saws.

EXAMPLE 1

Certain loads generate high frequency noise that has significantly high moving average baselines, especially during their start up. In order to eliminate nuisance tripping caused by these type of loads, series arc detection is preferably disabled for a predetermined time (e.g., without limitation, 1 second) if the first moving average or the second moving average is greater than a predetermined value (e.g., without limitation, for a chop saw, the moving average goes up significantly; the predetermined values for the first and second moving averages can be 160 and 140, respectively).

EXAMPLE 2

Line cycle (e.g., 60 Hz) wave shape information is preferably employed to provide adequate trip response to clearing time tests. This means that the trip response should be based on the load (e.g., 60 Hz) current waveform (not just the current peak value, but rather the rms value since some loads, such as a dimmer, may have a relatively high peak current value, but a relatively small rms value) and the required tripping time at different current levels in UL 1699. This checks the rms current value or the average rms current value of several cycles and finds the required tripping time. If the series chaos accumulator (series_accum of step 328 of FIG. 2E1) is greater than a suitable trip threshold (e.g., without limitation, the tripping bucket level of 300 counts) before the required tripping time (e.g., without limitation, 1 second at 5 $A_{RMS}$), then wait without tripping the circuit breaker 2 until a predefined time (e.g., without limitation, 100 mS for this example) before the required tripping time. If during this waiting period, an arc fault signal continues to be detected, then trip the circuit breaker 2. Otherwise, do not trip the circuit breaker 2 and reset the series chaos accumulator to zero.

No "point-on-wave" approach or load identification method is employed.

Referring to FIGS. 2A, 2B, 2C1-2C3, 2D and 2E1-2E2, the series arc fault detection routine 200 is shown. At 202 of FIG. 2A, the routine 200 starts. Next, at 204, interrupts are processed. These interrupts include an internal timer interrupt (from TMR0 122) of the μC 14 of FIG. 1, as will be explained, and an external μC interrupt 205 that is responsive to voltage zero crossings of the line-to-neutral voltage 17. Step 204 ensures that the external interrupt 205 is enabled and pending, disables the external interrupt, and clears the pending interrupt in a manner well known to those skilled in the art. If any spurious external μC interrupt is detected, then the routine 200 is bypassed until step 356 of FIG. 2E2. After 204, at 206, a counter (isr_sample_state) that keeps track of current samples is cleared. Next, at 208, it is determined if all N (e.g., without limitation, N=8 samples; any suitable count of samples) current samples have been collected. Here, the "N" is employed to count the number of interrupts per half-cycle of the source voltage. If not, then at 210, the next TMR0 interrupt is set up to occur. At 212, any pending TMR0 interrupt is cleared and the subsequent TMR0 interrupt is enabled. Otherwise, if all N current samples have been collected at 208, then, at 214, in order to await the next external μC interrupt 205, any pending TMR0 interrupt is cleared and subsequent TMR0 interrupts are disabled.

After either 212 or 214, even steps 216-232 acquire line cycle (e.g., without limitation, 60 Hz) data. First, at 216, it is determined if the default sampling channel is the low current channel (hi_current_sampling_counter=0). If so, then at 218, the line current (i_offset) is sampled with the low current channel 219 of ADC 30, and at 220, the analog ground reference (gnd) of ADC 30 is sampled with ADC channel 221. Step 222 calculates the signed, properly scaled current value (i_present) from the difference between the values from steps 218 and 220. On the other hand, if the default sampling channel is the high current channel, then at 224, the line current (i_offset) is sampled with the high current ADC channel 225, and at 226, the analog ground reference (gnd) of ADC 30 is sampled with ADC channel 221. Step 228 calculates the signed, properly scaled current value (i_present) from the difference between the values from steps 224 and 226, with the difference being shifted left by 2 example bits to provide proper scaling. Here, in this example, the "left shift by 2" is a result of the gains of the two 60 Hz current sampling channels differing by a factor of four. Next, after 222 or 228, step 230 determines if the low current ADC channel 219 is likely saturated. For example, this is determined if the magnitude of the current value (i_present) exceeds 384. The example ADC 30 has 10 bits or 1024 counts of amplitude resolution, and a scaling such that 1 Apeak~=9 A/D counts. A magnitude of "i_present" greater than 384 corresponds to a line current magnitude that is greater than about 42 Apeak. Thus, if the magnitude of an individual sample of 60 Hz current exceeds 384 (or about 42 Apeak), the μP 32 switches to sampling with the 200 Apeak, 60 Hz current channel. The value 384 was arbitrarily chosen because it is 75% of the maximum signed output count value (e.g., 512) of the ADC 30. If the test passes at 230, then the variable hi_current_sampling_counter is set to N1 (e.g., without limitation, 4; any suitable count). This sets the line current sampling to the high current ADC channel 225 for the remainder of this half-cycle and for the next N1 half-cycles.

Figure 2A:
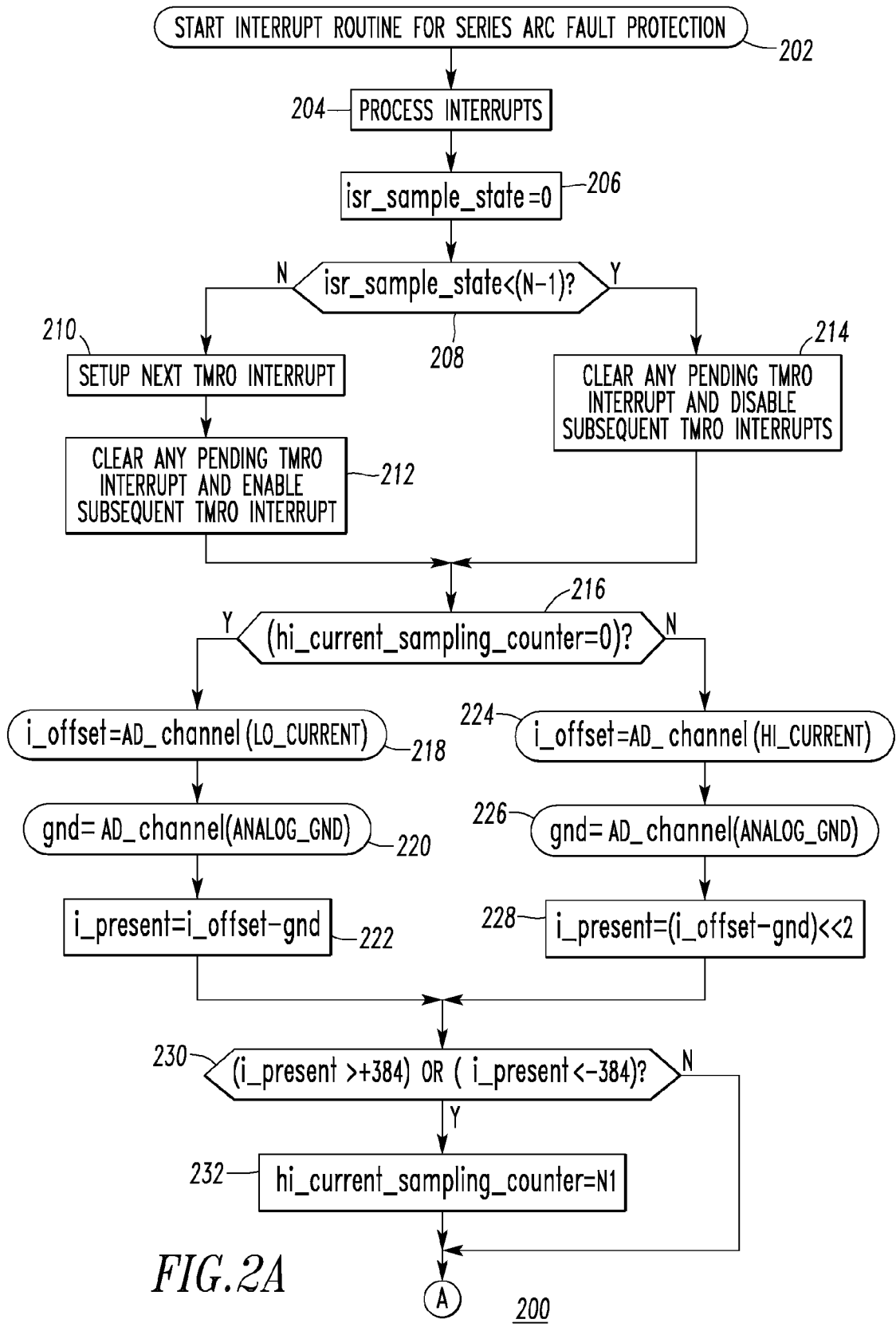
Figure 2B:
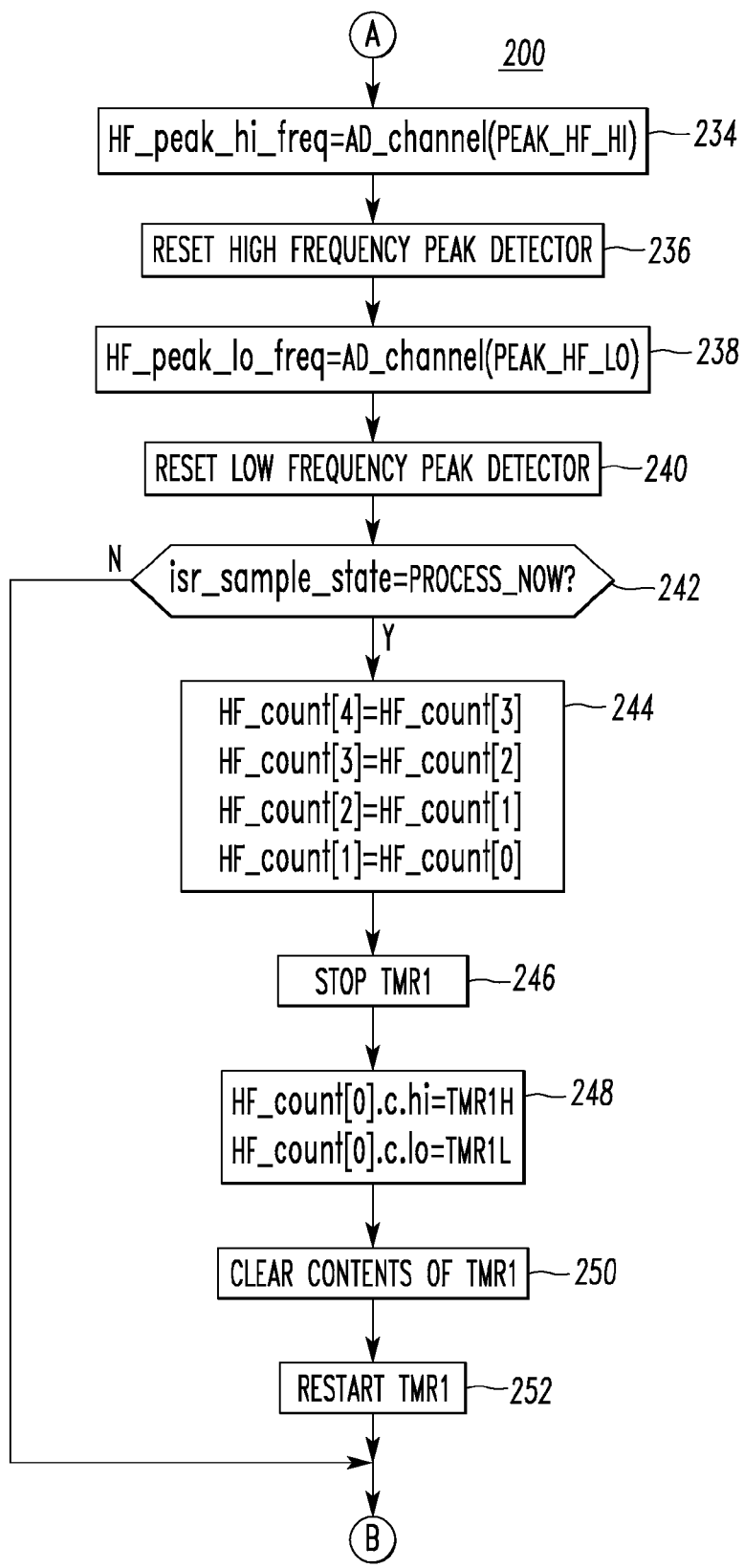

Next, after 232, or if the test at 230 failed, even steps 234-240 of FIG. 2B acquire high frequency (HF) peak detector data. First, at 234, the output of high frequency peak detector 110 is read (HF_peak_hi_req) from the corresponding channel 235 of ADC 41. Next, at 236, the high frequency peak detector 110 is reset by μC output 241. Then, at 238, the output of the low frequency peak detector 108 is read (HF_peak_lo_freq) from the corresponding channel 239 of ADC 30. Next, at 240, the low frequency peak detector 108 is reset by μC output 237.

After 240, step 242 determines if it is an appropriate time to finalize the acquisition of a "HF count" at steps 244 and 248. "HF count" is determined from μC counter (TMR1) 124 of FIG. 1. This counter 124 counts outputs from the two envelope detectors 112,114 which are within the ranges (i.e., each range tests for the corresponding envelope detector output being greater than a predetermined minimum value and being less than a predetermined maximum value) set by the two envelope detectors 112,114, respectively. The two comparators 116,118 compare envelope detector outputs with respective predetermined minimum values REFA,REFB. When either or both of the outputs of the two envelope detectors 112,114 are active, the counter 124 is incremented.

At 242, the appropriate time to finalize the acquisition of the "HF count" is determined if the variable (isr_sample_state) that keeps track of current samples is equal to a suitable value (PROCESS_NOW) (e.g., 8; any suitable value). The software for the AFCI circuit breaker 2 is generally organized in two parts: (1) data collection; and (2) data processing. Known AFCI data processing is implemented within an interrupt period that coincides with the zero crossing of the line-to-neutral voltage 17. The disclosed software implementation is different in that it allows data processing to occur during any interrupt period. Thus, any value of PROCESS_NOW of 0 to (N-1) should be suitable. If the test passes at 242, then even steps 244-248 acquire the "HF count" for the present half-cycle and update the old values for the "HF count" from a suitable number of previous half-cycles. First, step 244 saves the old values of "HF count". Next, at 246, the μC counter (TMR1) 124 is stopped. Then, at 248, the present value of TMR1 (e.g., without limitation, the timer's high and low bytes) is stored. Next, steps 250 and 252 respectively clear the contents of and restart TMR1. After 252, or if the test failed at 242, execution resumes at 254 of FIG. 2C1 which processes HF peak detector information.

Even steps 254-268 calculate a baseline at 268 that is the average value of the last eight values of the output of the low frequency peak detector 108 (HF_peak_lo_freq) that are less than a suitable threshold value. First, at 254, it is determined if the present low frequency peak detector output (238 of FIG. 2B) is less than HF_PEAK_THRESH_LF_LOWER_LIMIT (e.g., without limitation, 100; any suitable value). If not, then execution resumes at 270 of FIG. 2C2. Otherwise, if the test at 254 was met, then at 256, the present value of the low frequency peak detector output is added to a tally (HF_peak_lo_freq_tally), and at 258, the oldest value of the low frequency peak detector output (which is pointed to by pointer HF_peak_lo_freq_array_ptr) is subtracted from the tally. Then, at 260, the present value of the low frequency peak detector output is stored an array (HF_peak_lo_freq_array) as referenced by the pointer of 258. This present value replaces the oldest value in the array. Next, at 262, the pointer of 258 is incremented. Step 264 determines if the array pointer of 258 is pointing beyond the end of the array by checking if it exceeds a suitable value (e.g., without limitation, 7, since in this example the array is of size 8). If not, then execution resumes at 268. If so, then the pointer is cleared at 266, in order to point to the beginning of the array. Next, at 268, a baseline (HF_peak_lo_freq_baseline) is calculated as the average of the last eight values of the low frequency peak detector output, which are less than the corresponding lower limit of step 254. Then, at 270 of FIG. 2C2, a threshold (HF_peak_lo_freq_thresh) is calculated as the sum of the fixed lower limit threshold of step 254 plus a suitably weighted (e.g., without limitation, 3×) baseline from step 268 (3*HF_peak_lo_freq_baseline).

Even steps 272-288 calculate a baseline at 286 of FIG. 2C3 that is the average value of the last eight values of the output of the high frequency peak detector 110 (HF_peak_hi_freq) that are less than a suitable threshold value. First, at 272, it is determined if the present high frequency peak detector output (234 of FIG. 2B) is less than HF_PEAK_THRESH_HF_LOWER_LIMIT (e.g., without limitation, 60; any suitable value). If not, then execution resumes at 288 of FIG. 2C3. Otherwise, if the test at 272 was met, then at 274, the present value of the high frequency peak detector output is added to a tally (HF_peak_hi_req_tally), and at 276, the oldest value of the high frequency peak detector output (which is pointed to by pointer HF_peak_hi_freq_array_ptr) is subtracted from the tally. Then, at 278, the present value of the high frequency peak detector output is stored an array (HF_peak_hi_freq_array) as referenced by the pointer of 276. This present value replaces the oldest value in the array. Next, at 280, the pointer of 276 is incremented. Step 282 of FIG. 2C3 determines if the array pointer of 276 is pointing beyond the end of the array by checking if it exceeds a suitable value (e.g., without limitation, 7, since in this example the array is of size 8). If not, then execution resumes at 286. If so, then the pointer is cleared at 284, in order to point to the beginning of the array. Next, at 286, a baseline (HF_peak_hi_freq_baseline) is calculated as the average of the last eight values of the high frequency peak detector output, which are less than the corresponding lower limit of step 272. Then, at 288, a threshold (HF_peak_hi_freq_thresh) is calculated as the sum of the fixed lower limit threshold of step 272 plus a suitably weighted (e.g., without limitation, 3×) baseline from step 286 (3*HF_peak_hi_freq_baseline).

Next, step 290 compares the ADC-converted outputs of the two band pass filter peak detectors 108,110 to their respective thresholds of steps 270 and 288 to determine if either or both of the two current values of the peak detectors 108,110 indicate arcing. Here, the output of the low frequency band pass filter peak detector 108 is also checked to ensure that it is also less than an upper limit (HF_PEAK_THRESH_LF_UPPER_LIMIT) (e.g., without limitation, 250). This last check is done to eliminate certain loads that generate relatively strong repetitive signals at relatively lower frequencies. If this test passes, then an HF peak tally (HF_peak_tally_present) for the present half-cycle is increased by a suitable value (SERIES_ACCUM_RATE) (e.g., without limitation, 20) at 292. In this example, there is no upper threshold for the relatively higher frequencies. This is because certain loads (not shown) generate repetitive signals that can be higher than the upper threshold at the relatively lower frequencies.

Figure 2D:
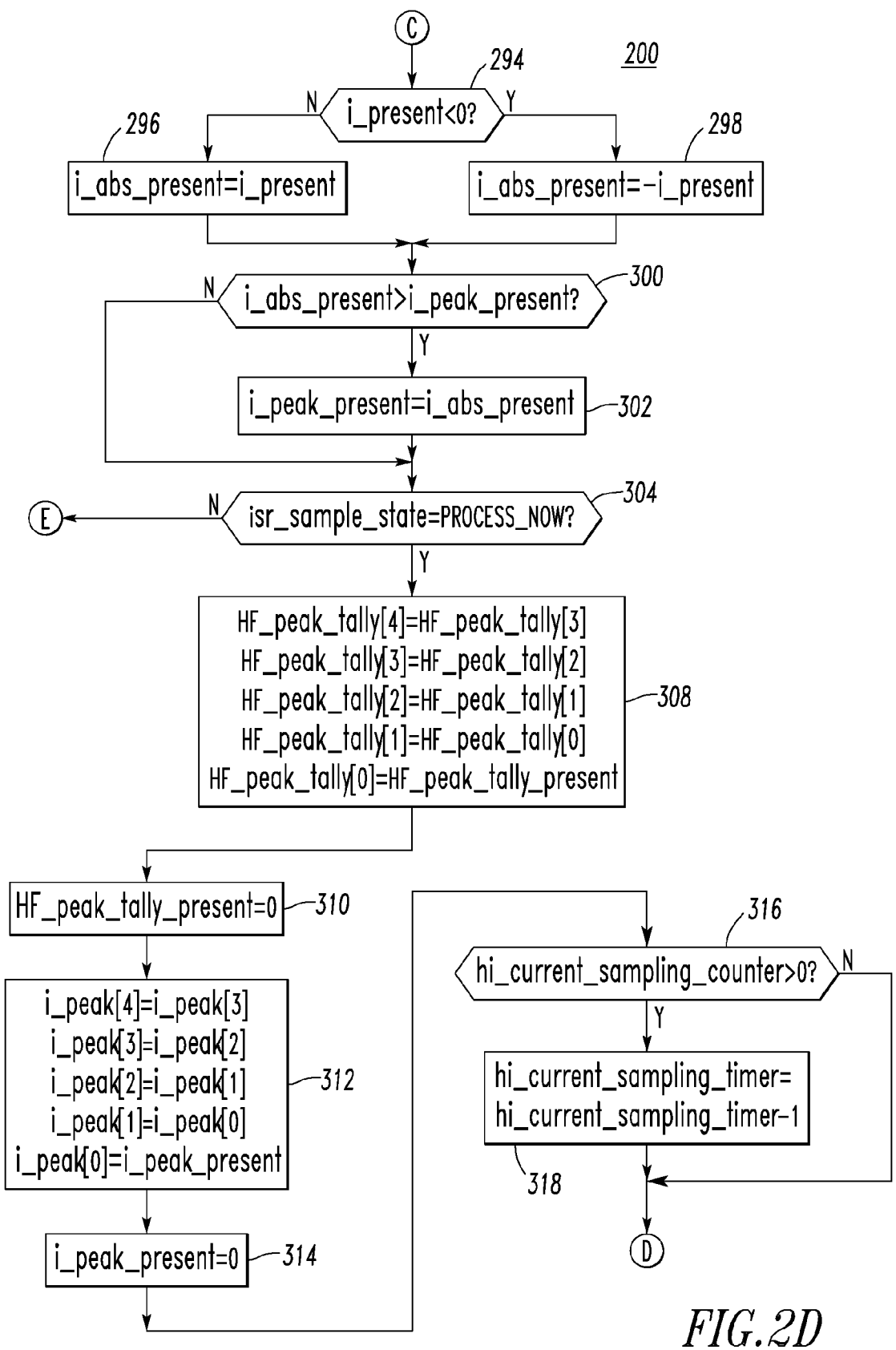

After 292, or if the test failed at 290, the peak value of the line current is captured at even steps 294-302 of FIG. 2D. At 294, it is determined if the scaled current value (i_present) of steps 222 or 228 (FIG. 2A) is negative. If not, then the absolute value of current (i_abs_present) is simply the same current value at 296. Otherwise, the absolute value of current (i_abs_present) is the negative of that current value at 298. After either 296 or 298, at 300, it is determined if the absolute value of the present current sample is greater than the content of a peak detector variable (i_peak_present). If so, then the peak detector variable is set equal to the absolute value of the present current sample at 302. Next, after 302 or if the test at 300 failed, even steps 304-318 perform processing of various data for the series arc detection routine of FIGS. 2E1-2E2.

At 304, it is determined if it is an appropriate time to perform the series arc detection algorithm 305 of FIG. 2E1. This is determined if the counter (isr_sample_state) that keeps track of current samples is equal to a suitable value (PROCESS_NOW). There are 8 example samples per half-cycle. The data processing that occurs when "isr_sample_state" equals "PROCESS_NOW" occurs after every 8 sampling periods.

If the test fails at 304, then execution resumes at step 342 of FIG. 2E2. On the other hand, at 308, the present value of the "HF peak tally" (HF_peak_tally_present) of step 292 of FIG. 2C3 is pushed into a corresponding FIFO stack. HF_peak_tally_present is a running tally that indicates the number of local minimums and maximums that occurred in the previous half-cycle of like polarity. This is a temporary bucket for the previous half cycle and will be put into the trip bucket if certain conditions are met.

Referring again to steps 290 and 292 of FIG. 2C3, "HF_peak_tally_present" is a temporary running tally of the number of times the conditions specified in step 290 are true within a given half-cycle. When this value is finalized (during data processing, which occurs during one sampling interval per half-cycle, at the conclusion of the sample when "isr_sample_state" equals "PROCESS_NOW"), the value of "HF_peak_tally_present" is transferred into the "HF_peak_tally" FIFO array. At 308, this value is transferred to HF_peak_tally[0] after the present half-cycle is completed. Then, at 310, the present value of "HF peak tally" is cleared. Next, at 312, the present value of the peak current (i_peak_present) of 302 is pushed into a corresponding FIFO stack. Then, at 314, the present value of the peak current (i_peak_present) is cleared. Next, at 316, it is determined if the high current channel is selected by determining if the variable hi_current_sampling_counter is greater than zero. If so, then that variable, which keeps track of the number of half-cycles of high current channel sampling, is decremented at 318. The intent is to sample the 60 Hz current for a few (e.g., N1=4) half-cycles of samples on the high current, low resolution ADC channel before switching back to the low current, high resolution ADC channel.

After 318, or if the test failed at 316, the series arc fault routine 305 of FIG. 2E1 begins. First, at 319, it is determined if the present peak line current (i_peak[0]) is greater than a suitable threshold (SERIES_AMPLITUDE_INHIBIT_THRESH) (e.g., without limitation, 30 $A_{RMS}$ or 42.4 A peak). If so, then at 320, a series amplitude inhibit timer (series_amplitude_inhibit_timer) is set to a suitable value to inhibit series arc protection (e.g., without limitation, 24 half-cycles or 200 mS). Otherwise, at 322, it is determined if the series amplitude inhibit timer is greater than zero. If so, then at 324, the series amplitude inhibit timer is decremented. Next at 326, which occurs after 320, 324 or if the test at 322 failed, it is determined if there is series arcing by looking for counter chaos and no recent line cycle peak currents greater than the threshold of 319. Here, for the test to pass, the series amplitude inhibit timer is zero, the present value of the "HF peak tally" (HF_peak_tally[0]) of step 308 (FIG. 2D) is non-zero, and counter chaos exists as is determined by the present value of "HF count" of step 248 (FIG. 2B) being different that the immediately previous value of "HF count" of like polarity (HF_count[2]). If so, then at 328, the contents of the present value of the "HF peak tally" are added to a series chaos accumulator (series_accum). If not, then at 330, the series chaos accumulator is decreased by a suitable decay rate (SERIES_DECAY_RATE) (e.g., without limitation, 8; any suitable value).

After either 328 or 330, at 332, it is determined if the series chaos accumulator is negative. If so, then the series chaos accumulator is set to zero at 334. Next, at 336, which occurs after 334 or if the test at 332 failed, the series arc fault routine 305 determines if a hazardous condition in the form of a series arc fault has occurred by checking if the series chaos accumulator is greater than a suitable trip threshold (SERIES_TRIP_LEVEL) (e.g., without limitation, 300; any suitable value). If so, then the circuit breaker 2 is tripped by setting the output 38 (SCR_GATE) (FIG. 1) true.

Next, at 342 of FIG. 2E2, which occurs after 338 or if the test at 336 failed, the sampling index (isr_sample_state) of 206 (FIG. 2A) is incremented. Next, at 346, it is determined if the next interrupt should be a timer interrupt (from TMR0 122) by checking if the sampling index (isr_sample_state) of 206 (FIG. 2A) is less than N-1. If so, then at 348, the external μC interrupt 205 is disabled and any pending external μC interrupt is cleared. Otherwise, the next interrupt should be the external μC interrupt 205, and step 350 clears any pending external μC interrupt and enables subsequent external μC interrupts. Next, after either 348 or 350, at 352, any pending TMR0 interrupts are cleared. Finally, any subsequent interrupts are enabled at 356 before the routine ends at 358. Steps 348,350,352,356 gracefully handle any interrupt that occurs unexpectedly.

EXAMPLE 3

Preferably, the μP 32 of FIG. 1 is structured to introduce "jitter" in the otherwise periodic data sampling times of the outputs of the peak detectors 108,110 as sensed through the respective ADC channels 239,235. One approach to eliminate repetitive high frequency signals generated by certain loads, such as dimmers, is to check if the variation between two adjacent peak values falls within a predefined range, such as 5%. If the variation falls within the predefined range, then the detected peak signal will not be counted as an arc fault generated signal. The "jitter" eliminates false series arc indication due to consistent large variations between two adjacent peak values caused by the periodic timer interrupt from the μP timer TMR0 122. When the circuit breaker 2 protects a dimmer (not shown) and an incandescent lighting load (not shown), the high frequency pulse associated with the turn-on of dimmer current occasionally coincides with the time when the high frequency peak detectors 108,110 are being reset (or clamped at zero volts) by the respective μP outputs 237,241. When this happens, the peak detectors 108,110 do not record the full peak value of the dimmer turn-on. Introducing "jitter" (i.e., random variations) in the timing of the otherwise periodic sampling intervals attempts to ensure that the periodic reset of the peak detectors 108,110 would infrequently coincide with the turn-on of any dimmer loads.

Alternatively, as shown at 326 of FIG. 2E1, this function is achieved by the counter outputs (|HF_count[0]-HF_count[2]|>1).

Although separable contacts 4 are disclosed, suitable solid state separable contacts may be employed. For example, the disclosed circuit breaker 2 includes a suitable circuit interrupter mechanism, such as the separable contacts 4 that are opened and closed by the operating mechanism 6, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter for an alternating current power circuit including a plurality of half-cycles, said arc fault circuit interrupter comprising:
    separable contacts;
    an operating mechanism structured to open and close said separable contacts;
    at least one current sensor structured to sense current flowing through said separable contacts;
    a first band pass filter cooperating with one of said at least one current sensor to output a first pass band having a first range of frequencies of said sensed current;
    a second band pass filter cooperating with one of said at least one current sensor to output a second pass band having a second range of frequencies of said sensed current, said second range of frequencies not overlapping and being greater than said first range of frequencies;
    a first peak detector cooperating with said first band pass filter to detect a plurality of first peak current values from said first pass band;
    a second peak detector cooperating with said second band pass filter to detect a plurality of second peak current values from said second pass band;
    a first envelope detector cooperating with said first band pass filter to detect a plurality of first occurrences from said first pass band being within a first predetermined range of magnitudes;
    a second envelope detector cooperating with said second band pass filter to detect a plurality of second occurrences from said second pass band being within a second predetermined range of magnitudes;
    a counter structured to count said first and second occurrences; and
    a processor structured to provide series arc detection and cooperating with one of said at least one current sensor to disable said series arc detection when the sensed current is greater than a first predetermined value,
    said processor further cooperating with said counter to determine a plurality of counts from said counter for said half-cycles, said processor further cooperating with said first and second peak detectors to determine a plurality of tallies responsive to one of said first peak current values exceeding a first threshold for said half-cycles or one of said second peak current values exceeding a second threshold for said half-cycles,
    said processor being further structured to determine presence of series arcing in said power circuit from: said sensed current being less than said first predetermined value for at least a predetermined time, the tally for a current one of said half-cycles being not zero, and the count of said counter for the current one of said half-cycles being different than the count of said counter for an immediately previous one of said half-cycles of like polarity by at least a second predetermined value,
    said processor being further structured to increase a series chaos accumulator responsive to said presence of series arcing.

2. The arc fault circuit interrupter of claim 1 wherein said first and second thresholds are first and second lower thresholds, respectively, both of said first and second lower thresholds being structured to enable said processor to detect noise generated by a series arc fault; and wherein said processor is further structured to determine said plurality of tallies responsive to said one of said first peak current values exceeding said first lower threshold and being less than a third upper threshold for said half-cycles or said one of said second peak current values exceeding said second lower threshold for said half-cycles.

3. The arc fault circuit interrupter of claim 1 wherein said first and second thresholds are first and second lower thresholds, respectively; wherein said first band pass filter has an output that is input by said first peak detector; wherein said second band pass filter has an output that is input by said second peak detector; and wherein said processor is further structured to remove baseline shifting of the outputs of said peak detectors.

4. The arc fault circuit interrupter of claim 1 wherein the first range of frequencies of said first band pass filter is about 100 kHz+/−3.125 kHz; and wherein the second range of frequencies of said second band pass filter is about 900 kHz+/−28.125 kHz.

5. The arc fault circuit interrupter of claim 1 wherein said first band pass filter is a two-stage band pass filter having a center frequency of about 100 kHz; and wherein said second band pass filter is a two-stage band pass filter having a center frequency of about 900 kHz.

6. The arc fault circuit interrupter of claim 1 wherein the minimum frequency of said first range of frequencies is about 50 kHz; wherein the maximum frequency of the second range of frequencies is about 2 MHz; and wherein each of said first and second band pass filters have a center frequency to bandwidth ratio of greater than about 5.

7. The arc fault circuit interrupter of claim 1 wherein said first predetermined value is about 30 $A_{RMS}$.

8. The arc fault circuit interrupter of claim 1 wherein said counter structured to count said first and second occurrences is structured to count high frequency pulses for each of said half-cycles to eliminate load noise associated with periodic high frequency signals.

9. The arc fault circuit interrupter of claim 1 wherein said processor is further structured to determine if said series chaos accumulator is negative and to responsively set said series chaos accumulator to zero.

10. The arc fault circuit interrupter of claim 1 wherein said processor comprises an output; and wherein said processor is further structured to determine the occurrence of a series arc fault when said series chaos accumulator is greater than a third predetermined value and to responsively set the output of said processor to cause said operating mechanism trip open said separable contacts.

11. The arc fault circuit interrupter of claim 1 wherein said processor is further structured to increase said series chaos accumulator by a predetermined amount responsive to said presence of series arcing.

12. The arc fault circuit interrupter of claim 1 wherein said processor is further structured to decrease said series chaos accumulator by a predetermined amount when said processor does not determine said presence of series arcing in said power circuit.

13. A method of detecting series arc faults for an alternating current power circuit including a plurality of half-cycles, said method comprising:
sensing current flowing through said power circuit and outputting a sensed current value;
employing a first band pass filter to output a first pass band having a first range of frequencies of said sensed current value;
employing a second band pass filter to output a second pass band having a second range of frequencies of said sensed current value, said second range of frequencies not overlapping and being greater than said first range of frequencies;
detecting a plurality of first peak current values from said first pass band;
detecting a plurality of second peak current values from said second pass band;
detecting a plurality of first occurrences from said first pass band being within a first predetermined range of magnitudes;
detecting a plurality of second occurrences from said second pass band being within a second predetermined range of magnitudes;
counting said first and second occurrences and outputting a count value;
providing series arc detection and disabling said series arc detection when said sensed current value is greater than a first predetermined value;
determining a plurality of counts from said count value for said half-cycles;
determining a plurality of tallies responsive to one of said first peak current values exceeding a first threshold for said half-cycles or one of said second peak current values exceeding a second threshold for said half-cycles;
determining presence of series arcing in said power circuit from: (1) said sensed current value being less than said first predetermined value for at least a predetermined time, (2) the tally for a current one of said half-cycles being not zero, and (3) the count for the current one of said half-cycles being different than the count for an immediately previous one of said half-cycles of like polarity by at least a second predetermined value; and
increasing a series chaos accumulator responsive to said presence of series arcing.

14. The method of claim 13 further comprising
employing the first range of frequencies of about 100 kHz+/−3.125 kHz; and
employing the second range of frequencies of about 900 kHz+/−28.125 kHz.

15. The method of claim 13 further comprising
employing a two-stage band pass filter having a center frequency of about 100 kHz as said first band pass filter; and
employing a two-stage band pass filter having a center frequency of about 900 kHz as said second band pass filter.

16. The method of claim 13 further comprising
employing the minimum frequency of said first range of frequencies of about 50 kHz;
employing the maximum frequency of said second range of frequencies of about 2 MHz; and
employing a center frequency to bandwidth ratio for each of said first and second band pass filters of greater than about 5.

17. The method of claim 13 further comprising
determining the occurrence of a series arc fault when said series chaos accumulator is greater than a third predetermined value and responsively interrupting said current flowing through said power circuit.

18. The method of claim 13 further comprising
periodically sampling the first peak current values from said first pass band;
periodically sampling the second peak current values from said second pass band; and
introducing random variations in said periodically sampling of said first peak current values from said first pass band and said second peak current values from said second pass band.

19. The method of claim 13 further comprising
employing first and second lower thresholds as said first and second thresholds, respectively;
removing baseline shifting of said plurality of first peak current values detected from said first pass band; and
removing baseline shifting of said plurality of second peak current values detected from said second pass band.

20. The method of claim 19 further comprising
employing a first moving average during said removing baseline shifting of said plurality of first peak current values detected from said first pass band;
employing a second moving average during said removing baseline shifting of said plurality of second peak current values detected from said second pass band; and
disabling said series arc detection for a predetermined time if said first moving average or said second moving average is greater than a predetermined value.

21. The method of claim 13 further comprising
determining a tripping time based upon said sensed current value;
determining if said series chaos accumulator is greater than a third predetermined value before said determined tripping time, and responsively waiting without tripping a circuit breaker until a predetermined time before said determined tripping time; and
during said responsively waiting, determining if there is said presence of series arcing and responsively tripping said circuit breaker, and, otherwise, resetting said series chaos accumulator to zero.

* * * * *